United States Patent Office
2,923,134
Patented Feb. 2, 1960

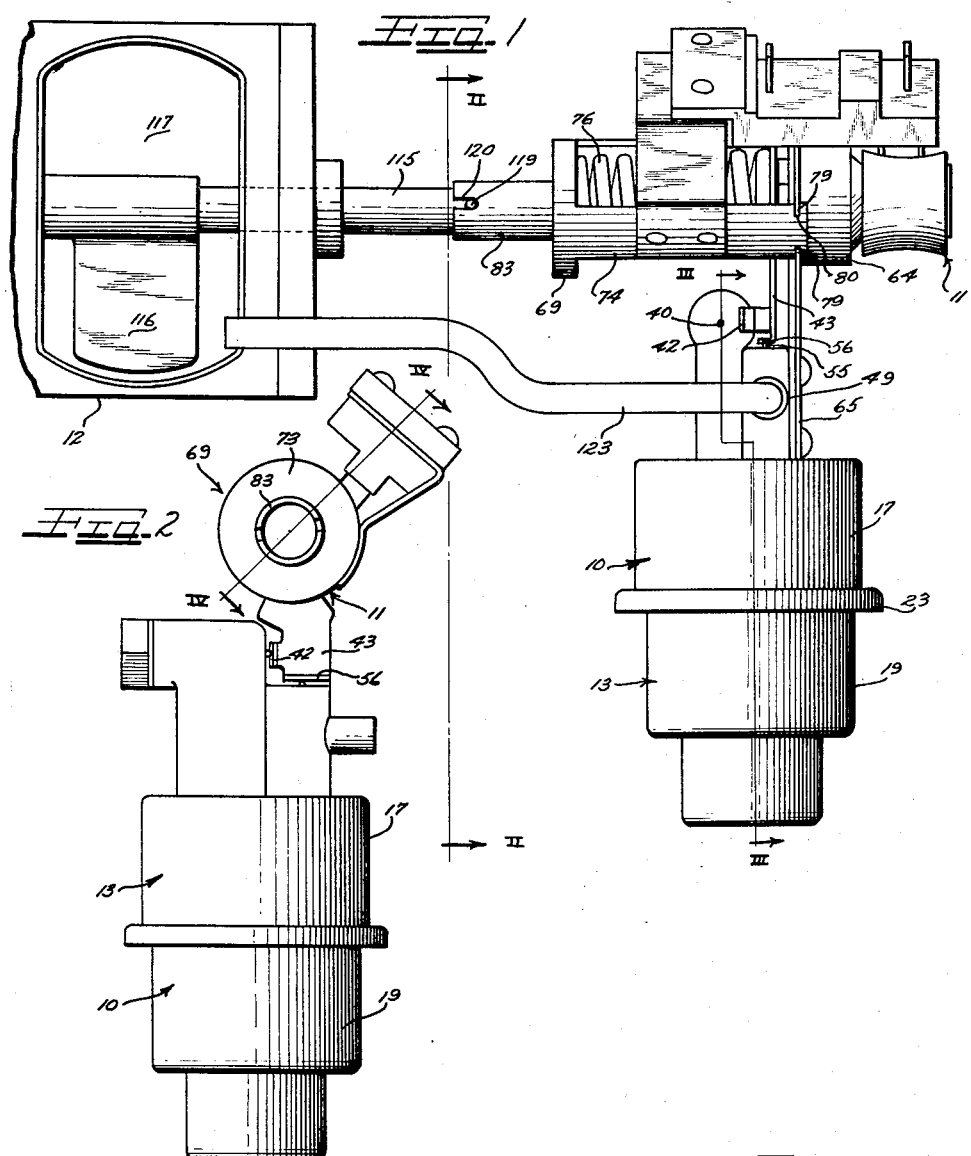

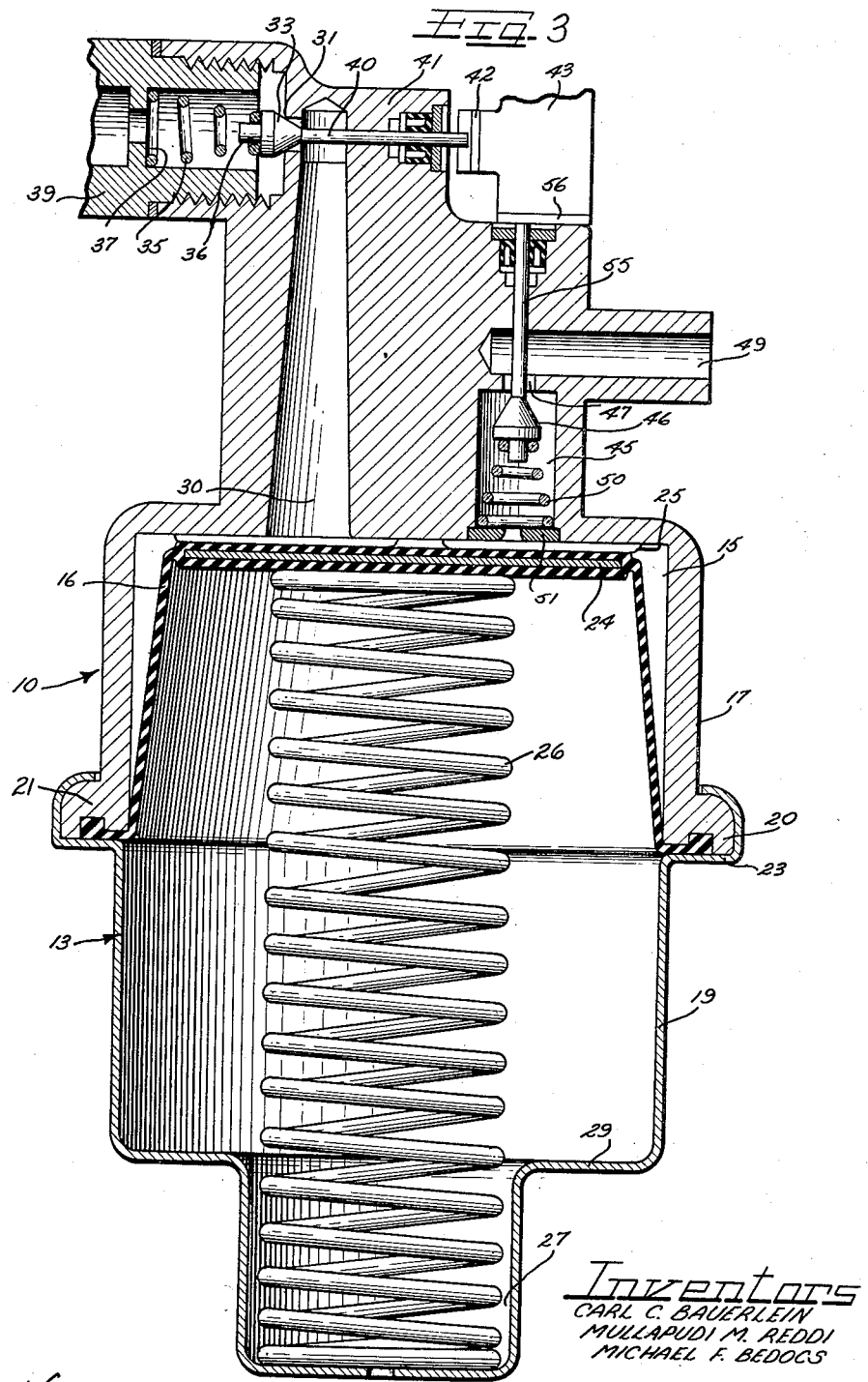

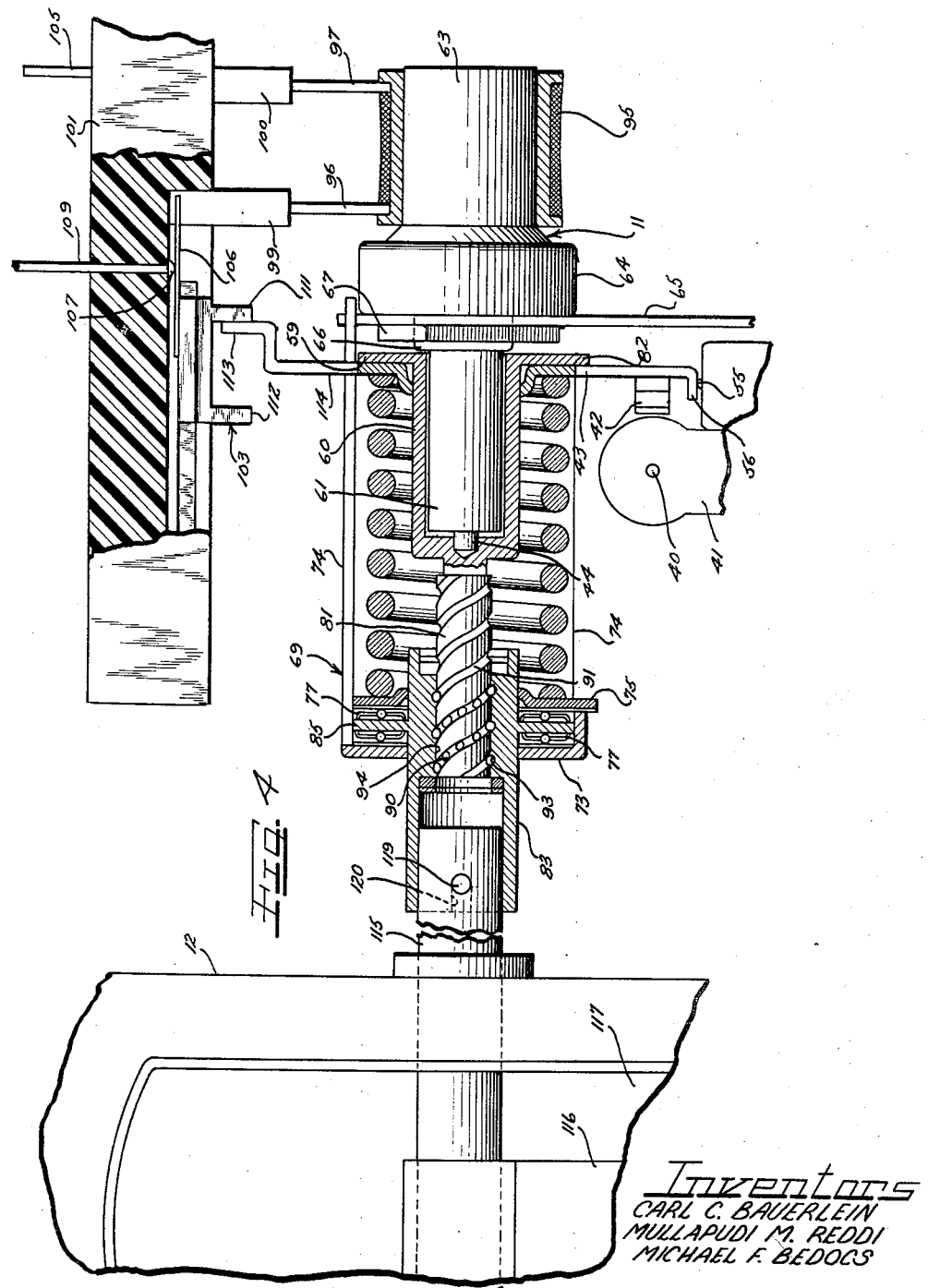

2,923,134

LIQUID MEASURING DEVICE

Carl C. Bauerlein, Lincolnwood, Mullapudi M. Reddi, Chicago, and Michael F. Bedocs, Wilmette, Ill., assignors to The Dole Valve Company, Chicago, Ill., a corporation of Illinois Application February 19, 1957, Serial No. 641,096

5 Claims. (Cl. 62—137)

This invention relates to improvements in liquid metering devices and drive mechanisms therefor.

A principal object of the invention is to provide a simplified form of liquid metering device and electrically energizable heat motor control means therefor.

Another object of the invention is to provide an improved form of measuring device having a diaphragm conforming to one-half of a chamber and biased into engagement with an end thereof, in which liquid under pressure conforms the diaphragm to the other half of the chamber and the biasing means extends the diaphragm to dispense a measured volume of liquid from the chamber, all under the control of translational movement of an electrically energizable heat motor serving as the motive power for rotatably driving a device to be supplied with liquid.

Still another object of the invention is to provide a novel and improved form of heat motor particularly adapted to serve as a drive and control means for automatic ice makers and the like.

A still further object of the invention is to provide a simplified and improved form of heat motor so constructed and arranged as to effect certain operations by translational movement of the power member thereof, and converting translational movement of the power member to rotational movement, to effect certain other operations.

A still further object of the invention is to provide a novel and improved form of heat motor in which a high motion solid fill type of thermal sensitive element is cyclically heated to extensibly move the power member of the thermal sensitive element, and in which the power member of the thermal sensitive element has drive connection with an axially aligned rotatable member and rotatably drives said member by translational movement of the power member through a simple and improved form of helical motion converting driving arrangement.

A still further object of the invention is to provide a simple and efficient form of heat motor particularly adapted to control the filling of the ice cube tray of an ice cube maker and to eject ice cubes from the tray of the ice cube maker, having a solid fill high motion type of thermal sensitive element heated by resistor heat, to effect extensible movement of a power member of the thermal sensitive element, and having a simplified form of motion converting means aligned with and operated by translational movement of the power member for converting the translational motion of the power member to rotary motion.

These and other objects of the invention will appear from time to time as the following specification proceeds and with reference to the accompanying drawings wherein:

Figure 1 is a top plan view of a heat motor constructed in accordance with the invention, showing the heat motor connected with the ice cube ejector mechanism of an icemaker, and showing a measuring and dispensing device for metering a measured volume of water to the ice cube tray of the icemaker;

Figure 2 is an end view of the heat motor and dispenser with the ice cube maker removed and looking substantially along line II—II of Figure 1;

Figure 3 is a fragmentary sectional view taken through the measuring and dispensing device substantially along line III—III of Figure 1; and Figure 4 is a fragmentary sectional view taken through the heat motor, substantially along line IV—IV of Figure 2.

In the embodiment of the invention illustrated in the drawings, we have shown a metering or measuring and dispensing device 10 controlled by a heat motor 11, which may be operated under the control of the cyclic control for an icemaker (not shown), and which may also operate to supply the power to eject ice cubes from an ice cube tray 12 of an icemaker.

The metering device 10 is so arranged as to supply a uniformly measured volume of water to the ice cube tray 12 at the termination of the operation of ejecting ice cubes from the tray, and to avoid over or under filling of the tray. The metering device 10 includes a housing 13 having a collapsible chamber 15 therein having a liner in the form of a flexible diaphragm 16, generally conforming to one-half of the wall of the measuring chamber when said chamber is empty, and to the other half of the wall of the measuring chamber when said chamber is full.

As herein shown, the housing 13 is in two halves 17 and 19. The half 17 has an annular rim 20 extending about the end thereof adjacent the half 19 and having an annular bead 21 of the diaphragm 16 recessed therein and sealed thereto by engagement of the half 19 therewith. The two halves of the chamber are shown as being secured together by turning or spinning a flanged portion 23 of the half 19 over the bead 21 of the half 17.

The diaphragm 16 is shown as having a diaphragm plate 24 embedded in the end thereof and as being biased into engagement with an inner wall 25 of the half 17 of the housing 13 by a compression spring 26. The spring 26 is seated in a cup-like seat 27, extending outwardly from an end wall 29 of the half 19.

The diaphragm 24 is biased into engagement with the end wall 29 as by the pressure of fluid thereon, such as the water pressure entering the chamber 15 through an inlet 30 opening into the chamber 15 through the end wall 25 thereof. The inlet 30 is shown in Figure 3 as having communication with a valve seat and port 31 adjacent its outer end, herein shown as extending at right angles to the axis of the inlet 30 and closed by a valve 33 having a conical valve face biased into engagement with port 31, as by a compression spring 35. The spring 35 is shown as being seated on a shouldered portion 36 of the valve 33 at one end and as being seated at its opposite end against a shoulder 37 of an inlet fitting 39. The valve 33 has a stem 40 extending therefrom through the port 31 and is slidably mounted in a body portion 41 of the housing 13. The stem extends through the body portion 41 and out through an outer face thereof on the opposite side of the valve body from the inlet fitting 39, and is suitably sealed to said body portion. The end of the valve stem 40 is adapted to be engaged by a camming face 42 of a rectilinearly movable camming operator 43, operated by extensible movement of a power member 44 of the heat motor 11. The chamber 15 also has an outlet 45 leading therefrom closed by a valve 46 engaging a seat formed by the inlet end of an outlet port 47 leading to an outlet passageway 49, adapted to supply a measured volume of water to the ice cube tray 12, under the control of the outlet valve 46 as shown in Figure 3. The valve 46 is biased into engagement with the upstream end of the port 47 by a compression spring 50 seated in the outlet 45 against an orifice member 51 at the inlet end thereof. The valve 46 is like the valve 33 and has a stem 55 extending therefrom and slidably guided in and extending outwardly of the body portion 41 of the chamber 13, and engaged at its outer end by a rectilinearly movable camming face 56 of the camming operator 43. The camming operator 43 is shown as being in the form of a plate mounted on a flange 59 of an operator 60 and extending about the lower end portion of said operator. The operator 60 is mounted on the outer end of the power member or piston 44 of the heat motor and extends along a cylinder 61 of said heat motor, and is slidably movable therealong upon extensible and retractible movement of the piston 44 with respect to the cylinder 61.

It may be seen from Figure 1, that when the piston 44 is in its retracted position, and the heat motor 11 is cool, that the camming face 56 will be in engagement with the stem 55 of the valve 46 and hold said valve open, to accommodate the spring 26 to move the diaphragm 16 along the chamber 15 into engagement with the wall 25, and expel a measured volume of liquid from said chamber, for filling the ice cube tray 12.

As the heat motor 11 is heated, extensible movement of the power member 44 will move the camming face 42 into engagement with the end of the stem 40 to effect opening of the valve 33 for filling the chamber 25 and moving the diaphragm 16 against the spring 26 into engagement with the wall 29 of the half 19 of the housing 13. At this time the valve 46 will have been closed by its biasing spring 50 and by the pressure of fluid acting thereon.

The heat motor 11 is shown as including a thermal sensitive element of the so-called power or high motion solid fill type, such as is shown and described in the Vernet Patent No. 2,368,181, dated January 30, 1945, and selected for its compactness and simplicity, as well as its extreme power and the relatively long range of travel of the piston 44 thereof from the cylinder 61, upon heating of the thermal sensitive element to its operating temperature range. In such types of thermal sensitive elements, a thermal medium (not shown) in the form of a fusible thermally expansible material is contained within a casing 63 for the thermal sensitive element and reacts against a membrane or deformable member (not shown), to extend the power member or piston 44 from the cylinder 61 as the thermal medium reaches its fushion point.

As herein shown, a clamping ring 64 of the thermal sensitive element, clamping the casing 63 to the cylinder 61, abuts the bottom or outer face of a flat bracket 65. The cylinder 61 has an enlarged diameter portion 66 extending through said bracket and secured thereto as by a nut 67 threaded on said enlarged diameter portion and abutting the opposite face of the bracket 65 from the clamping ring 64, for securing said thermal sensitive element to said bracket and positioning the cylinder 61 and power member 44 to extend within a housing 69 for the heat motor. The bracket 65 serves as an outer plate for the housing 69 and forms a means for attaching the heat motor 11 to the body portion 41 of the housing 13.

The housing 69 has an end wall 73 at its end opposite the bracket or end wall 65 and has spaced legs 74 extending therefrom to the bracket 65. The legs 74 are in the form of segments of a cylinder, as shown in Figure 1. The free ends of the legs 74 are shown as being slotted from opposite sides thereof as indicated by reference character 79. The slotted portions 79 fit within slotted portions 80 of the bracket 65 for the housing 69.

A return spring 76 is seated at one end on a retainer plate 75 for thrust bearings 77 and at its opposite end on the portion of the cam member 43 extending about the operator 60. Said spring biases said cam member into engagement with the flange 59 of said operator and also returns the power member 44 within the cylinder 61.

The operator 60 is shown as having a shaft 81 extending therefrom within a drive sleeve 83, and as being movable along said drive sleeve upon extensible and retractible movement of the power member 44 of the thermal element.

The drive sleeve 83 is shown as having a flange 85 extending outwardly therefrom intermediate the ends thereof. Opposite faces of said flange abut the thrust bearings 77, one of which thrust bearings abuts the inner side of the end wall 73 for the casing 69 and the other of which abuts the inner wall of the retainer 75. The thrust bearings 77 thus retain the flange 85 and sleeve 83 from axial movement with respect to the housing 69 and accommodate rotational movement thereof.

Translational movement of the shaft 81 is converted to rotational movement by a plurality of balls 90 carried in a helical groove 91 extending along the shaft 81 from one end thereof to the other and meshing with a helical groove 93 formed in an interior wall 94 of the sleeve 83. The shaft 81 is held from rotation by a projecting portion 82 of the operator 60 extending in the space between two adjacent legs 74.

Thus upon heating of the fusible thermally expansible material within the casing 63 and extensible movement of the power member 44 from the cylinder 61, the balls 90 carried in the spiral grooves 91 and reacting against the mating spiral grooves 93 in the sleeve 83 will effect rotational movement of the sleeve 83 about the translationally moving shaft 81.

The casing 63 of the thermal sensitive element is shown as being heated by a resistor heater 95 encircling the casing 63 and energized through terminals 96 and 97 extending therefrom. The terminals 96 and 97 are connected with contacts 99 and 100, respectively, extending outwardly from a switch block 101, having a slide 103 slidably guided therein, for movement therealong. The contact 100 is directly connected with a terminal 105 extending from the switch block for connection with a source of power supply. The contact 99 is slidably engaged by a resilient switch arm 106 slidably engaging a contact 107 energized through a terminal 109. The slide 103, slidably guided in the switch block 101, has spaced fingers 111 and 112 engageable with a finger 113 on the outer end of an arm 114 extending from the opposite side of the cam member 43 from the cam faces 42 and 56, and spaced therefrom in such relation that when the piston 44 is in its retracted position and the cam face 56 is in engagement with the valve stem 55 to open the valve 46, the finger 113 will be in the position shown in Figure 4 and the resistor heater will be energized through the terminals 105 and 109. When, however, the piston 44 has been extended from the cylinder 61 to the full extent of its travel and the cam face 56 has moved out of engagement with the valve stem 55 and the cam face 43 has come into engagement with the valve 40, to close the valve 46 and open the valve 33, the contact arm 106 will have moved out of engagement with the contact 99. This will deenergize the resistor heater 95, allowing the thermal sensitive element to cool. After a predetermined time delay interval, the spring 76 will return the piston 44 within the cylinder 61 to close the valve 33 and then open the valve 46. Retractible movement of the piston 44 will also effect engagement of the finger 113 with the finger 111 to again complete an energizing circuit from the contact 107 to the contact 99 through the contact arm 106, and condition the resistor heater 95 to be energized in the proper cycle of operation of the icemaker or other device to be operated by the heat motor.

The open end of the sleeve 83 is shown as forming a socket for driving an ejector shaft 115 extending along the top of the ice cube tray 12 and having ejector paddles 116 extending therefrom and movable downwardly into molds 117 in the ice cube tray to push or turn ice cubes therefrom upon turning movement of said ejector paddles. The drive shaft 115 is shown as having pins 119 extending therefrom and engageable with drive slots 120 opening to the outer end of the sleeve 43.

Thus when water in the ice cube tray 12 is frozen, a thermal element (not shown), sensing the temperature of the ice in the ice cube tray, will effect the closing of an electric switch (not shown) to complete a circuit to the resistor heater 95 through the terminals 105 and 109. This will cause an increase in temperature of the fusible thermally expansible material within the casing 63, and will effect extension of the power member or piston 44 from the cylinder 61 and translationally move the shaft 81 within the sleeve 83. The reaction of the balls against the grooves 91 and 94 will effect turning movement of the sleeve 83, to turn the ejector shaft 115 in a direction to move the ejector paddles 116 into the ice cube molds 117 and turn or push ice cubes therefrom. At the same time the cam face 42 coming into engagement with the end of the stem 40 of the valve 33 will effect opening of said valve and filling of the chamber 15 with water. As the heat motor cools, the cam face 42 will be moved out of engagement with the end of the stem 40 and accommodate closing of the valve 33 by its spring 35, while the cam face 56 will move into engagement with the stem 55, after a predetermined time delay, to effect opening of the valve 46 and filling of the ice cube tray 12 with a measured volume of water through a filler tube 123 connected from the outlet 49 to the cavities 117 of the ice cube tray 12.

It will be understood that various modifications and variations in the present invention may be effected without departing from the spirit and scope of the novel concepts thereof.

We claim as our invention:

1. In a liquid measuring and dispensing device, a housing having a measuring chamber therein, a diaphragm within said measuring chamber conforming to one-half of said measuring chamber when full, and to the opposite half of said measuring chamber when empty, an inlet into said measuring chamber through an end wall thereof, an outlet from said measuring chamber through said end wall, individual valves in said inlet and said outlet, spring biased into closed positions, spring means biasing said diaphragm to conform to the inlet end of said measuring chamber, and means for operating said valve in said inlet to admit liquid under pressure into said measuring chamber and to accommodate the pressure of the liquid entering said chamber to move said diaphragm against said spring, said means being operable to accommodate closing of said valve in said inlet and to then open said valve in said outlet, for the dispensing of a measured volume of liquid through said outlet, and a heat motor including a thermal sensitive element having a power member extensible upon increases in temperature, electrical heating means for heating said thermal sensitive element to effect the extensible movement of said power member, a rectilinearly movable operator engaged by said power member and having operative connection with said valves for opening said inlet valve and accommodating closing of said outlet valve upon extensible movement thereof, spring means returning said operator and power member into positions to accommodate closing of said inlet valve and opening said outlet valve upon retractible movement of said power member.

2. In an ice cube maker, an ice tray having ice molds therein, an ejector shaft extending along said tray and having ejector paddles projecting therefrom for pushing ice cubes from said molds, a measuring device for measuring and metering a measured volume of water to said ice cube tray, said measuring device having spaced inlet and outlet valves having depressible stems for operating the same, a heat motor including a thermal sensitive element and having a rectilinearly movable operator, electrical heating means for said thermal sensitive element, means operable in accordance with rectilinear movement of said operator to control said heating means, camming means extending from said operator and moved thereby for maintaining said outlet valve open when said heat motor is cold, and opening said inlet valve upon heating of said heat motor, said heat motor having a rotatable sleeve in axial alignment with said operator, and an interengaging connection between said operator and said sleeve, converting the translational movement of said operator into rotational movement, to operate said ejector shaft to push ice cubes from said tray, upon heating of said heat motor by energization of said heating means, said operator also translationally moving said camming means to effect opening of said inlet valve during the operation of ejecting ice cubes from said tray.

3. In an ice cube maker, an ice tray having ice molds therein, means ejecting ice cubes from said tray comprising a rotary ejector shaft, means metering a measured volume of water to said molds comprising a chamber having a diaphragm therein, an inlet valve admitting water under pressure to said chamber to extend said diaphragm, spring means biasing said inlet valve to a closed position, an outlet valve for releasing water from said chamber, spring means biasing said valve closed, other spring means engageable with said diaphragm and biasing said diaphragm in a direction to eject water from said chamber through said outlet valve, means opening said outlet valve comprising translationally movable cam means, means for operating said cam means comprising a thermal sensitive element having an extensible piston, electrically energizable means for heating said thermal sensitive element to effect extensible movement of said piston, an operator carried by said piston having operative connection with said cam means to effect translational movement of said cam means upon extensible movement of said piston, a rotatable drive member in axial alignment with said operator, a helical drive connection between said operator and drive member for effecting rotatable movement of said drive member to rotatably drive said ejector shaft, upon extensible movement of said power member, and means operable in accordance with movement of said piston for controlling said heating means.

4. In a liquid metering device, a housing having a chamber therein, an inlet into said chamber through an end wall thereof, an outlet from said chamber through said end wall, an inlet valve in said inlet, a stem for said valve, spring means biasing said valve in a closed position, an outlet valve in said outlet, a stem for said valve, spring means biasing said valve into a closed position, said stems projecting from said housing, a diaphragm sealed at its edge to said chamber intermediate the end walls thereof, a spring biasing said diaphragm into engagement with the end wall of said chamber having said inlet leading thereinto, a heat motor mounted on said housing and including a thermal sensitive element having an extensible power member, a rectilinearly guided operator engaged by said power member and moved along said housing upon extensible movement of said power member, a shaft extending from said operator and retained from rotatable motion, a drive member rotatably carried in said housing in axial alignment with said shaft, electric heating means for heating said thermal sensitive element to effect extensible movement of said power member, means operable in accordance with movement of said operator to control said heating means, a spring retractably moving said power member upon reductions in temperature, said operator having spaced cam faces thereon, one cam face engaging said stem for said outlet valve when said heat motor is cold, to effect opening of said outlet valve, a second cam face engaging said stem for said inlet valve upon heating of said heat motor and upon sufficient movement of said operator to engage said one cam face from said stem of said outlet valve to effect opening of said inlet valve, and interengaging helical drive means between said shaft and said driven member, converting the translational movement of said shaft to rotary motion.

5. In a liquid metering device, a housing having a chamber therein, an inlet into said chamber through an end wall thereof, an outlet from said chamber through said end wall, an inlet valve in said inlet, spring means biasing said valve into a closed position, an outlet valve in said outlet, spring means biasing said valve into a closed position, a diaphragm sealed at its edge to said chamber intermediate the end wall thereof, a spring biasing said diaphragm into engagement with the end wall of said chamber having said inlet leading thereinto, a heat motor including a thermal sensitive element having an extensible power member, an operator engaged by said power member and rectilinearly moved in one direction upon extensible movement of said power member, cam means movable upon movement of said operator for operating at least one of said valves, a rotatable sleeve held from axial movement and rotatably mounted in axial alignment with said power member and operator, an interengaging helical drive connection between said operator and sleeve converting the translational motion of said operator to rotary motion, electrically energizable means for heating said thermal sensitive element to effect extensible movement of said power member, a spring retractably moving said power member upon deenergization of said electrically energizable means, and means carried by said operator and operable in accordance with movement thereof for controlling energization and deenergization of said heating means.

References Cited in the file of this patent

UNITED STATES PATENTS

| | | |
|---|---|---|
| 186,863 | Meikle | Jan. 30, 1877 |
| 1,833,950 | Modine | Dec. 1, 1931 |
| 1,845,997 | Spencer | Feb. 16, 1932 |
| 2,117,211 | Reutter | May 10, 1938 |
| 2,568,107 | Allen | Sept. 18, 1951 |
| 2,710,107 | Powell | June 7, 1955 |
| 2,717,498 | Shagaloff | Sept. 13, 1955 |
| 2,735,589 | Milster | Feb. 21, 1956 |
| 2,778,198 | Heath | Jan. 22, 1957 |
| 2,808,707 | Chace | Oct. 7, 1957 |
| 2,833,157 | Gates | May 6, 1958 |